(12) United States Patent
Bae et al.

(10) Patent No.: US 11,757,298 B2
(45) Date of Patent: Sep. 12, 2023

(54) CHARGING SYSTEM AND METHOD USING MOTOR DRIVING SYSTEM

(71) Applicants: HYUNDAI MOTOR COMPANY, Seoul (KR); KIA MOTORS CORPORATION, Seoul (KR)

(72) Inventors: Su Hyun Bae, Daegu (KR); Jung Mo Yu, Seoul (KR); Jae Ho Hwang, Daejeon (KR); Joo Young Park, Yongin-si (KR); Yong Jae Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 156 days.

(21) Appl. No.: 16/953,756

(22) Filed: Nov. 20, 2020

(65) Prior Publication Data

US 2021/0336472 A1   Oct. 28, 2021

(30) Foreign Application Priority Data

Apr. 28, 2020   (KR) .......................... 10-2020-0051840

(51) Int. Cl.
*B60L 53/24* (2019.01)
*H02J 7/16* (2006.01)
(Continued)

(52) U.S. Cl.
CPC ................ *H02J 7/16* (2013.01); *B60L 53/24* (2019.02); *B60L 53/62* (2019.02); *B60L 58/12* (2019.02);
(Continued)

(58) Field of Classification Search
CPC ...... H02J 7/16; H02J 7/0048; H02J 7/007182; B60L 53/62; B60L 53/24; B60L 58/12
See application file for complete search history.

(56) References Cited

U.S. PATENT DOCUMENTS

2012/0019174 A1* 1/2012 Mahlein .................. B60L 50/51
318/139
2013/0221903 A1* 8/2013 Hwang ..................... H02J 7/04
320/137
(Continued)

FOREIGN PATENT DOCUMENTS

CN      105244982 A  *  1/2016
CN      105244982 B      1/2018
(Continued)

OTHER PUBLICATIONS

Chou "Choose Your IGBTs Correctly for Solar Inverter Applications", Power Electronics Technology, Aug. 2008 (Year: 2008).*
(Continued)

*Primary Examiner* — Drew A Dunn
*Assistant Examiner* — Pamela J Jeppson
(74) *Attorney, Agent, or Firm* — Morgan, Lewis & Bockius LLP (57) ABSTRACT

A charging system and method using a motor driving system which can charge a vehicle battery using charging equipment providing various voltages using a motor driving system provided in a vehicle and improve charging efficiency by selectively determining a charging mode in response to an actual voltage state of the vehicle battery.

9 Claims, 4 Drawing Sheets

(51) Int. Cl.
  B60L 53/62 (2019.01)
  B60L 58/12 (2019.01)
  H02J 7/00 (2006.01)

(52) U.S. Cl.
  CPC ...... *H02J 7/0048* (2020.01); *H02J 7/007182* (2020.01)

(56) References Cited

U.S. PATENT DOCUMENTS

| | | | | |
|---|---|---|---|---|
| 2014/0368170 | A1* | 12/2014 | Tang | B60L 3/003 320/137 |
| 2015/0298563 | A1* | 10/2015 | Jeong | H02J 7/0048 320/109 |
| 2019/0315234 | A1 | 10/2019 | Shin et al. | |
| 2020/0298722 | A1* | 9/2020 | Smolenaers | B60L 53/53 |

FOREIGN PATENT DOCUMENTS

| | | |
|---|---|---|
| EP | 2765022 A2 | 8/2014 |
| JP | 2014161142 A * | 9/2014 |
| KR | 10-2019-0119778 A | 10/2019 |
| KR | 10-2020-0068175 A | 6/2020 |

OTHER PUBLICATIONS

Tanaka H et al., JP2014161142A Machine translation, Apr. 2014 (Year: 2014).*
Gao Q et al., CN-105244982-A Machine translation, Jan. 2016 (Year: 2016).*
Extended European Search Report dated Apr. 26, 2021 issued in European Patent Application No. 20208341.6.

* cited by examiner

CHARGING SYSTEM AND METHOD USING MOTOR DRIVING SYSTEM

CROSS-REFERENCE TO RELATED APPLICATION

This application claims the benefit of priority to Korean Patent Application No. 10-2020-0051840, filed on Apr. 28, 2020 in the Korean Intellectual Property Office, the disclosure of which is incorporated herein by reference.

TECHNICAL FIELD

The present disclosure relates to a charging system and method using a motor driving system, and more specifically, to a charging system and method using a motor driving system which can charge a vehicle battery using charging equipment providing various voltages using a motor driving system provided in a vehicle and improve charging efficiency according to a state of the vehicle battery.

BACKGROUND

In general, electric vehicles or plug-in hybrid vehicles can generate power by charging their batteries with power supplied from external charging equipment and driving motors using electric energy stored in the charged batteries.

As a method for charging an on-board battery, a slow charging method for charging a battery at a relatively low speed using a vehicle-mounted charger that receives external AC charging power and converts the received power into DC charging power with a level suitable for battery charging, and a rapid charging method for rapidly charging a battery by directly providing external DC charging power to the battery are applied.

In the case of the rapid charging method, charging may be impossible when charging equipment cannot provide a voltage with a level capable of charging a battery of a vehicle. For example, although charging equipment for rapid charging is manufactured such that it outputs a single voltage specification of 400 V, a battery used in a vehicle may be designed such that it is charged with 800 V or higher in order to improve efficiency and a drivable distance. In such a case, since rapid charging equipment provides a charging voltage of 400 V but the battery used in a vehicle has a voltage specification of 800 V or higher, it is impossible to directly connect the rapid charging equipment to the vehicle to charge the battery, and a voltage-boosting converter for boosting a voltage provided from external charging equipment is additionally required for charging.

However, a large-capacity voltage-boosting converter for boosting 400 V to 800V or higher has a considerable weight and volume and is expensive and thus it is difficult to install in a vehicle and may cause a vehicle price to increase when provided in the vehicle.

Accordingly, in this technical field, a technique of converting external charging power provided to a neutral point of a motor using an inverter and then providing the converted power to a battery to charge the battery was proposed as a new charging technique of receiving a voltage from existing charging equipment and providing a relatively low charging voltage, boosting the voltage to a high voltage without an additional apparatus and additional cost increase, and supplying the high voltage to a battery (KR 10-2019-0119778 A).

The aforementioned charging technique using a motor driving system uses a method of boosting a charging voltage input to a neutral point to which 3-phase coils included in a motor are connected and applying the boosted voltage to a battery connected to an inverter by controlling an interconnection structure of the 3-phase coils and switching elements of the inverter such that the interconnection structure serves as a converter.

In this conventional charging technique using a motor driving system, one of a mode in which a DC voltage provided from charging equipment is directly applied to a battery according to a voltage specification of the battery and a mode in which a DC voltage is applied to a neutral point of a motor, boosted using the motor driving system and provided to a battery is selected and applied.

However, since the conventional technique does not determine a charging method on the basis of an actual voltage of a battery, the battery may be charged through a voltage conversion process of a motor driving system even when a DC voltage can be directly applied to the battery, and thus problems of efficiency deterioration due to switching loss or charging power reduction and charging time increase may be generated.

The information disclosed in the Background section above is to aid in the understanding of the background of the present disclosure, and should not be taken as acknowledgement that this information forms any part of prior art.

SUMMARY

Therefore, the present disclosure has been made in view of the above problems, and it is an object of the present disclosure to provide a charging system and method using a motor driving system which can charge a vehicle battery using charging equipment providing various voltages using a motor driving system provided in a vehicle and improve charging efficiency by selectively determining a charging method according to an actual voltage state of the vehicle battery.

In accordance with an aspect of the present disclosure, a charging system using a motor driving system includes: an inverter including switching elements connected between a DC connecting terminal and an AC connecting terminal to which a battery is connected and configured to adjust on/off states of the switching elements to perform power conversion between the DC connecting terminal and the AC connecting terminal; a motor including a plurality of coils connected to the AC connecting terminal; a first relay having a first end connected to the DC connecting terminal and a second relay having a first end connected to a neutral point of the motor, a second end of the first relay and a second end of the second relay being connected to a charging power input terminal; and a controller configured to control states of the first relay and the second relay based on a result of comparison between a voltage detection value of the battery and a maximum charging voltage value provided from a charging equipment to the charging power input terminal such that charging power supplied from the charging equipment is provided to the battery.

In an exemplary embodiment of the present disclosure, the controller may determine one of a first charging mode and a second charging mode. In the first charging mode, the first relay is short-circuited and the second relay is opened such that the charging power is directly applied to the DC connecting terminal to charge the battery, and in the second charging mode, the first relay is opened and the second relay is short-circuited such that the charging power is applied to the neutral point of the motor and on/off states of the switching elements are controlled to convert the voltage of the charging power applied to the neutral point of the motor and output the converted voltage to the DC connecting terminal to charge the battery.

In an exemplary embodiment of the present disclosure, the controller may charge the battery in the first charging mode when the voltage detection value of the battery is less than the maximum charging voltage value.

In an exemplary embodiment of the present disclosure, the controller may determine a remaining charging time required for the battery to be charged to a state of charge corresponding to the maximum charging voltage value, charge the battery in the first charging mode when the remaining charging time is longer than a predetermined reference time, and charge the battery in the second charging mode when the remaining charging time is shorter than or equal to the reference time.

In an exemplary embodiment of the present disclosure, the controller may determine one of the first charging mode and the second charging mode by applying the voltage detection value of the battery and charging current provided from the charging equipment to a charging mode determination table according to a relationship between a voltage or state of charge of the battery and the charging current provided from the charging equipment.

In an exemplary embodiment of the present disclosure, the charging mode determination table may be determined such that the first charging mode is executed when the voltage or state of charge of the battery is lower than a reference voltage or a reference SOC and the charging current is lower than a reference charging current, and the second charging mode is executed when the voltage or state of charge of the battery is higher than the reference voltage or the reference SOC and the charging current is higher than the reference charging current.

In an exemplary embodiment of the present disclosure, the controller may change a charging mode to the second charging mode when the voltage detection value of the battery becomes greater than or equal to the maximum charging voltage value or a state of charge corresponding to the voltage detection value of the battery becomes greater than or equal to a state of charge corresponding to the maximum charging voltage value during execution of the first charging mode.

In an exemplary embodiment of the present disclosure, the controller may provide a charging current command of 0 A to the charging equipment when the voltage detection value of the battery becomes greater than or equal to the maximum charging voltage value or a state of charge corresponding to the voltage detection value of the battery becomes greater than or equal to a state of charge corresponding to the maximum charging voltage value during execution of the first charging mode, open the first relay and short-circuit the second relay when current provided from the charging equipment substantially becomes 0 A, and then increase the current command.

In accordance with another aspect of the present disclosure, a charging method using a motor driving system including: an inverter including switching elements connected between a DC connecting terminal and an AC connecting terminal to which a battery is connected and configured to adjust on/off states of the switching elements to perform power conversion between the DC connecting terminal and the AC connecting terminal; a motor including a plurality of coils connected to the AC connecting terminal; and a first relay having a first end connected to the DC connecting terminal and a second relay having a first end connected to a neutral point of the motor, a second end of the first relay and a second end of the second relay being connected to a charging power input terminal, includes: comparing a voltage detection value of the battery with a maximum charging voltage value provided from a charging equipment to the charging power input terminal or comparing a state of charge of the battery corresponding to the voltage detection value of the battery with a state of charge corresponding to the maximum charging voltage value when charging starts; and executing a first charging mode in which the first relay is short-circuited and the second relay is opened such that charging power is directly applied to the DC connecting terminal to charge the battery when the voltage detection value of the battery is less than the maximum charging voltage value or the state of charge of the battery corresponding to the voltage detection value of the battery is less than the state of charge corresponding to the maximum charging voltage value.

In an exemplary embodiment of the present disclosure, the charging method may further include executing a second charging mode, in which the first relay is opened and the second relay is short-circuited such that the charging power is applied to the neutral point of the motor and on/off states of the switching elements are controlled to convert the voltage of the charging power applied to the neutral point of the motor and output the converted voltage to the DC connecting terminal to charge the battery, when the voltage detection value of the battery is greater than or equal to the maximum charging voltage value or the state of charge of the battery corresponding to the voltage detection value of the battery is greater than or equal to the state of charge corresponding to the maximum charging voltage value.

In an exemplary embodiment of the present disclosure, the charging method may further include determining a remaining charging time required for the battery to be charged to a state of charge corresponding to the maximum charging voltage value, executing the first charging mode when the remaining charging time is longer than a predetermined reference time, and executing the second charging mode in which the first relay is opened and the second relay is short-circuited such that the charging power is applied to the neutral point of the motor and on/off states of the switching elements are controlled to convert the voltage of the charging power applied to the neutral point of the motor and output the converted voltage to the DC connecting terminal to charge the battery when the remaining charging time is shorter than or equal to the reference time.

In an exemplary embodiment of the present disclosure, the charging method may further include determining one of the first charging mode and the second charging mode by applying the voltage detection value of the battery and charging current provided from the charging equipment to a charging mode determination table according to a relationship between a voltage or state of charge of the battery and the charging current provided from the charging equipment.

In an exemplary embodiment of the present disclosure, the charging mode determination table may be determined such that the first charging mode is executed when the voltage or state of charge of the battery is lower than a reference voltage or a reference SOC and the charging current is lower than a reference charging current, and the second charging mode is executed when the voltage or state of charge of the battery is higher than the reference voltage or the reference SOC and the charging current is higher than the reference charging current.

In an exemplary embodiment of the present disclosure, the charging method using a motor driving system may further include changing a charging mode to the second charging mode in which the first relay is opened and the second relay is short-circuited such that the charging power is applied to the neutral point of the motor and on/off states of the switching elements are controlled to convert the voltage of the charging power applied to the neutral point of the motor and output the converted voltage to the DC connecting terminal to charge the battery when the voltage detection value of the battery becomes greater than or equal to the maximum charging voltage value or a state of charge corresponding to the voltage detection value of the battery becomes greater than or equal to a state of charge corresponding to the maximum charging voltage value during execution of the first charging mode.

In an exemplary embodiment of the present disclosure, the charging method using a motor driving system may further include providing a charging current command of 0 A to the charging equipment when the voltage detection value of the battery becomes greater than or equal to the maximum charging voltage value or a state of charge corresponding to the voltage detection value of the battery becomes greater than or equal to a state of charge corresponding to the maximum charging voltage value during execution of the first charging mode, opening the first relay and short-circuiting the second relay when current provided from the charging equipment substantially becomes 0 A, and then increasing the current command.

DETAILED DESCRIPTION

Hereinafter, a charging system and method using a motor driving system according to various embodiments will be described in detail with reference to the attached drawings.

Figure 1:
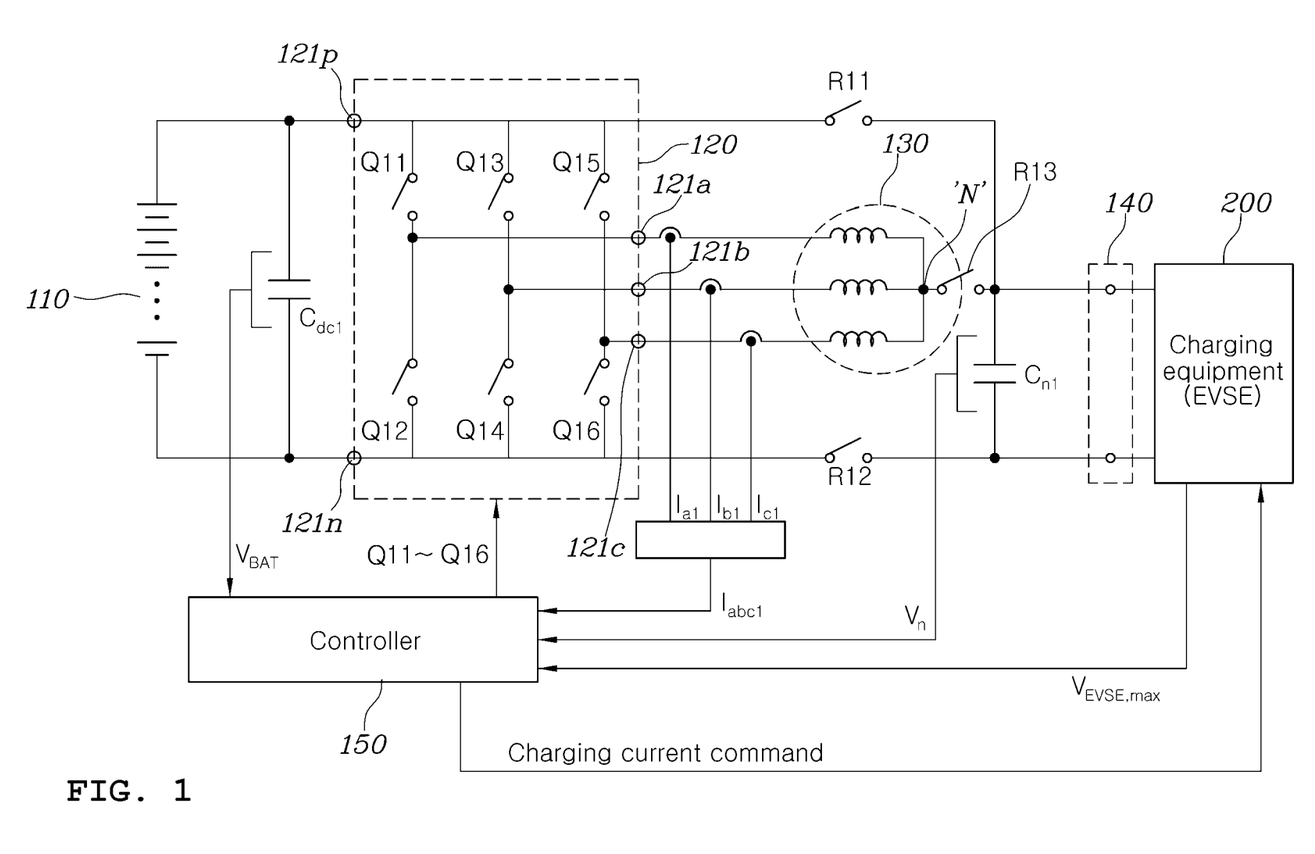
FIG. 1 is a configuration diagram of a charging system using a motor driving system according to an exemplary embodiment of the present disclosure.

FIG. 1 is a configuration diagram of a charging system using a motor driving system according to an exemplary embodiment of the present disclosure.

Referring to FIG. 1, the charging system according to an exemplary embodiment of the present disclosure may include a battery 110, an inverter 120, a motor 130, a plurality of relays R11 and R12, and a controller 150 included in a vehicle.

In general, a system for driving the motor 130 may include the battery 110 that is an energy storage device for storing power for driving the motor 130 and the inverter 120 that converts DC power stored in the battery 110 into 3-phase AC power and provides the 3-phase AC power to the motor 130. The inverter 120 includes DC connecting terminals including a positive (+) terminal 121p and a negative (−) terminal 121n respectively connected to both ends of the battery 110 and three legs connected in parallel between the DC connecting terminals. Two switching elements Q11 and Q12, Q13 and Q14, and Q15 and Q16 are connected in series to each leg, and interconnection nodes of two switching elements serve as motor connecting terminals 121a, 121b and 121c connected to the respective phases of the motor 130.

For driving of the motor, pulse width modulation control of the switching elements Q11 to Q16 included in the inverter 120 may be performed such that a current of a current command corresponding to a torque of the motor 130 which will be obtained through operation of the motor 130 can be provided to the motor 130. In this manner, an energy flow for driving the motor 130 is in a direction from the battery 110 to the motor 130 of FIG. 1.

When power supply is performed in a direction from a neutral point 'N' of the motor 130 to the DC connecting terminals 121p and 121n of the inverter 120, two switching elements Q11 and Q12, Q13 and Q14, or Q15 and Q16 included in one leg of the inverter 120 and a coil in the motor 130, one end of which is connected to the interconnection node of the two switching elements, may construct a single DC converter circuit which can boost a neutral point voltage and provide the boosted voltage to the DC connecting terminals of the inverter.

Accordingly, an interconnection structure of the inverter 120 and coils in the motor 130 has three converter circuits connected in parallel, and the voltage of the neutral point N can be boosted and provided to the battery 110 by controlling the switching elements Q11 to Q16 such that the DC converters connected in parallel operate simultaneously, selectively or in an interleaved manner.

Embodiments of the present disclosure can be implemented such that a first charging mode in which external charging power supplied from an external charging equipment 200 (e.g., electric vehicle supply equipment (EVSE)) to a charging input/output port 140 of the vehicle is directly provided to the battery 110 on the basis of a maximum voltage level of the external charging power and a current voltage (i.e., a voltage detection value) of the battery and a second charging mode in which the external charging power is provided to the neutral point N of the motor 130 and then boosted through control of the switching elements Q11 to Q16 of the inverter 120 and provided to the battery 110 are selectively used.

The controller 150 may include a non-transitory memory storing an algorithm or instructions for performing arithmetic operations or determination and a processor for executing the algorithm or instructions stored in the memory to perform determination and decision. In embodiments of the present disclosure, the controller 150 can determine selection of the first charging mode or the second charging mode or determine whether to switch the first charging mode to the second charging mode. The controller 150 may be implemented in the form of a vehicle controller, a motor controller or a battery management system included in a vehicle or additionally provided in the vehicle.

The operation and effects of the controller 150 will be understood more clearly through description of a charging method using a motor driving system according to an embodiment of the present disclosure which will be described later.

Figure 2:
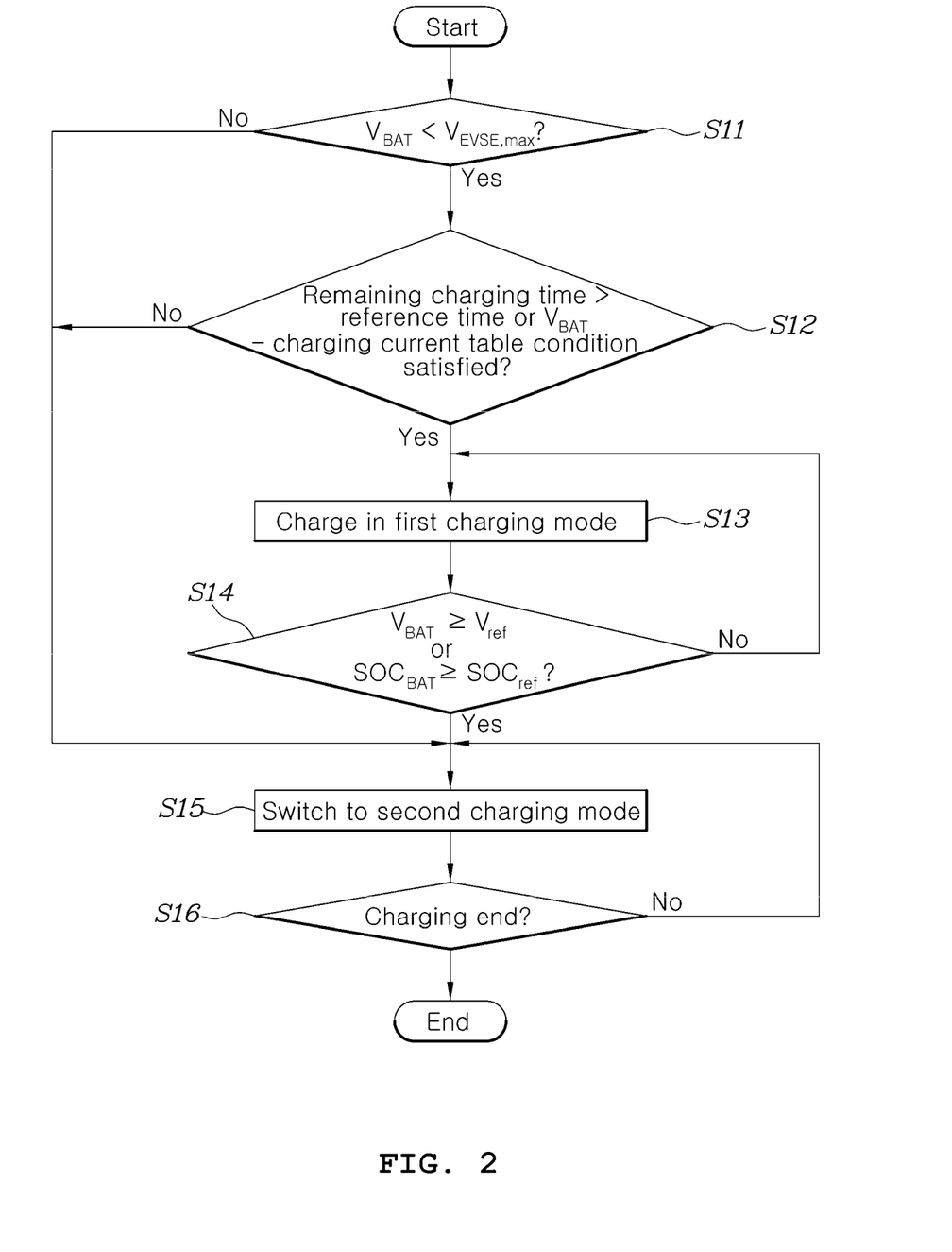
FIG. 2 is a flowchart of a charging method using a motor driving system according to an exemplary embodiment of the present disclosure.

FIG. 2 is a flowchart of the charging method using a motor driving system according to an exemplary embodiment of the present disclosure.

Referring to FIG. 2, when external charging equipment 200 is electrically connected to the charging input/output port 140 of the vehicle and a charging process starts, the controller 150 can receive a voltage detection value $V_{BAT}$ obtained by detecting the voltage of the battery 110 in the vehicle and a maximum charging voltage value $V_{EVSE,max}$ of charging power provided from the charging equipment 200 and compare the two values (S11).

Subsequently, the controller 150 can determine a charging mode by selectively performing step S12.

Step S12 is for determining whether execution of the first charging mode can obtain substantial advantage, that is, substantial effect of reducing a charging time.

In step S12, a remaining charging time required for the battery 110 to be charged to a state of charge (SOC) corresponding to the maximum charging voltage value $V_{EVSE,max}$ can be determined and compared with a predetermined reference time. In general, a battery voltage changes according to the battery SOC. For example, a battery voltage is high when a battery SOC is high, and the battery voltage is low when the battery SOC is low. Accordingly, a battery SOC can be detected through a battery voltage.

As described above, the first charging mode is a mode in which DC charging power is directly provided to the battery 110 without a conversion process and the second charging mode is a mode in which a voltage level is converted through switching of switching elements of a voltage-boosting converter circuit implemented as the motor 130 and the inverter 120 and provided as charging power to the battery 110. The first charging mode is executed when a voltage detection value of the battery 110 is less than the maximum charging voltage value of the charging equipment 200. The first charging mode needs to be switched to the second charging mode when the voltage detection value of the battery 110 increases to be greater than the maximum charging voltage value according to charging.

Furthermore, as will be described later, charging current provided from the charging equipment 200 needs to be substantially reduced to 0 A in order to change states of the relays R11 and R12 for charging mode switching and should be increased to a desired value in order to resume charging. Here, a certain amount of time is required to decrease or increase the charging current. That is, to switch charging modes such that charging is continuously performed, a certain amount of time is required. Accordingly, when a time required to switch charging modes is longer than a charging time that can be reduced by applying the first charging mode, it may be more desirable to apply the second charging mode from the start of charging rather than applying the first charging mode even when the voltage detection value $V_{BAT}$ of the battery 110 is less than the maximum charging voltage value $VEVSE._{max}$.

Considering this fact, the controller 150 can determine a remaining charging time required for the battery 110 to be charged to a state of charge (SOC) corresponding to the maximum charging voltage value $V_{EVSE,max}$ and compare the remaining charging time with a predetermined reference time in step S12, execute the first charging mode if the remaining charging time is longer (S13) and execute the second charging mode if not (S15). Here, the reference time may correspond to a time required to switch charging modes.

Alternatively, it is possible to determine whether to execute the first charging mode according to the SOC of the battery 110 and the magnitude of the charging current provided from the charging equipment 200 in step S12.

When the SOC of the battery 110 is low, a time required for charging in the first charging mode increases and thus it is advantageous to apply the first charging mode in this case. If the magnitude of the charging current provided from the charging equipment 200 is sufficiently high, execution of only the second charging mode instead of the first charging mode may be more efficient to fully charge the battery to a voltage higher than the maximum charging voltage value $V_{EVSE,max}$ of the charging equipment 200 without charging mode switching.

Figure 3:
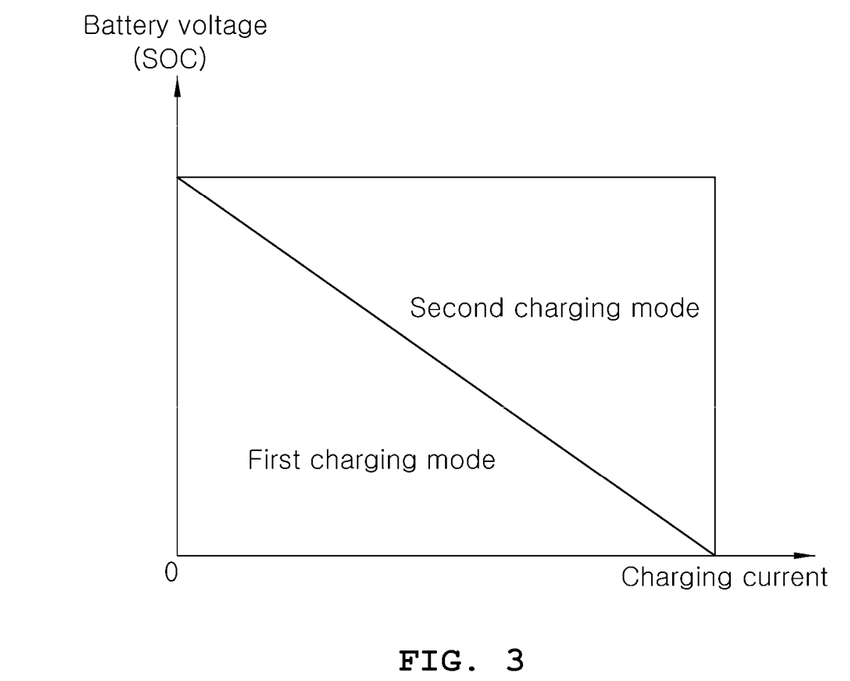
FIG. 3 is a diagram for describing the concept of a charging mode determination table applied to the charging system and method using a motor driving system according to an exemplary embodiment of the present disclosure.

FIG. 3 is a diagram for describing the concept of a charging mode determination table applied to the charging system and method using a motor driving system according to an exemplary embodiment of the present disclosure.

As shown in FIG. 3, the controller 150 can prestore a table in which execution of the first charging mode or the second charging mode is determined according to the relationship between the SOC of the battery 110 and charging current and determine whether to execute the first charging mode or the second charging mode using the table.

The controller 150 can perform step S12 after step S11 to determine a charging mode or perform only one of the two steps S11 and S12 to determine a charging mode.

When execution of the first charging mode is determined as a result of determination of step S11 and/or step S12, the controller 150 can short-circuit the first relay R11 and the third relay R13 and open the second relay R12 such that the charging power provided to the charging input/output port 140 can be directly provided to the battery 110 without a charging power conversion process to charge the battery 110 (S13).

Subsequently, when the voltage detection value $V_{BAT}$ of the battery 110 becomes greater than or equal to the maximum charging voltage value $V_{EVSE,max}$ (i.e., $V_{ref}$) or SOC corresponding to the voltage detection value $V_{BAT}$ of the battery 110 becomes greater than or equal to SOC corresponding to the maximum charging voltage value $V_{EVSE,max}$ (i.e., $SOC_{ref}$) (S14) during execution of the first charging mode (S13), the controller 150 can change the first charging mode to the second charging mode (S15) by opening the first relay R11 and short-circuiting the second relay R12 and the third relay R13.

Subsequently, the controller 150 can determine that charging ends when the SOC of the battery 110 reaches a preset target value or the battery 110 is fully charged (S16) and end the charging process.

In step S14 of switching charging modes, the controller 150 can control states of the relays R11 and R12 while adjusting the magnitude of the charging current provided from the charging equipment 200 by transmitting a charging current command to the external charging equipment 200.

In one embodiment, the charging mode determination table is determined such that the first charging mode is executed when the voltage or the SOC of the battery 110 is lower than a reference voltage or a reference SOC and the charging current is lower than a reference charging current and the second charging mode is executed when the voltage or the SOC of the battery 110 is higher than the reference voltage or the reference SOC and the charging current is higher than the reference charging current.

Figure 4:
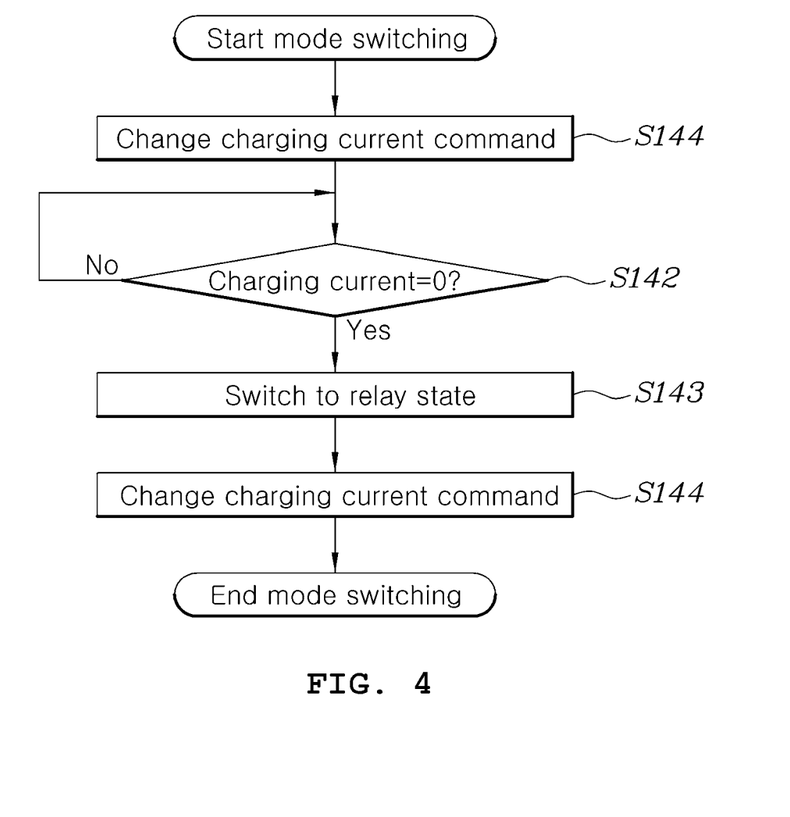
FIG. 4 is a flowchart showing a charging mode switching step in the charging system and method using a motor driving system according to an exemplary embodiment of the present disclosure in more detail.

FIG. 4 is a flowchart showing the charging mode switching step in the charging system and method using a motor driving system according to an exemplary embodiment of the present disclosure in more detail.

Referring to FIG. 4, when the voltage detection value $V_{BAT}$ of the battery 110 becomes greater than or equal to the maximum charging voltage value $VEVSE._{max}$ or SOC corresponding to the voltage detection value $V_{BAT}$ of the battery becomes greater than or equal to SOC corresponding to the maximum charging voltage value $VEVSE._{max}$ (S14) during execution of the first charging mode (S13), the controller 150 can provide a charging current command of 0 to the charging equipment 200 (S141), set a circuit configuration such that the second charging mode in which charging is performed according to voltage conversion through the motor 130 and the inverter 120 is executed by opening the first relay R11 and short-circuiting the second relay R12 (S143) after confirming that current provided from the charging equipment 200 substantially becomes 0 A (S142), and then increase the current command and provide the same to the charging equipment 200 such that current having a desired magnitude can be provided from the charging equipment.

As described above, the charging system and method using a motor driving system according to various embodiments of the present disclosure can reduce a battery charging time and improve charging efficiency by directly applying charging power supplied from external charging equipment to a battery without converting a voltage level in a state in which an actually measured battery voltage (i.e., battery voltage detection value) is lower than a maximum charging voltage value provided by the external charging equipment even when battery specifications are higher than the maximum charging voltage value provided by the external charging equipment.

It will be appreciated by those skilled in the art that the effects achievable through the present disclosure are not limited to those that have been particularly described hereinabove and that other unmentioned effects of the present disclosure will be more clearly understood from the above detailed description.

Although specific embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A charging system using a motor driving system, comprising:
    an inverter including switching elements connected between a DC connecting terminal and a motor connecting terminal to which a battery is connected and configured to adjust on/off states of the switching elements to perform power conversion between the DC connecting terminal and the motor connecting terminal;
    a motor including a plurality of coils connected to the motor connecting terminal;
    a first relay having a first end connected to the DC connecting terminal and a second relay having a first end connected to a neutral point of the motor, a second end of the first relay and a second end of the second relay being connected to a charging power input terminal; and
    a controller configured to control states of the first relay and the second relay based on a result of comparison between a voltage detection value of the battery and a maximum charging voltage value provided from a charging equipment to the charging power input terminal such that charging power supplied from the charging equipment is provided to the battery,
    wherein the controller determines one of a first charging mode and a second charging mode, wherein:
    in the first charging mode, the first relay is closed and the second relay is opened such that the charging power is directly applied to the DC connecting terminal to charge the battery, and
    in the second charging mode, the first relay is opened and the second relay is closed such that the charging power is applied to the neutral point of the motor and on/off states of the switching elements are controlled to convert the voltage of the charging power applied to the neutral point of the motor and to output the converted voltage to the DC connecting terminal to charge the battery,
    wherein the controller changes a charging mode to the second charging mode when the voltage detection value of the battery becomes greater than or equal to the maximum charging voltage value or a state of charge (SOC) corresponding to the voltage detection value of the battery becomes greater than or equal to an SOC corresponding to the maximum charging voltage value during execution of the first charging mode, and
    wherein when the controller determines to change the charging mode to the second charging mode, the controller transmits a charging current command of 0 A to the charging equipment, controls states of the first relay and the second relay to the second charging mode when current provided from the charging equipment substantially becomes 0 A, and increases the charging current command such that the battery is charged in the second charging mode.

2. The charging system of claim 1, wherein the controller charges the battery in the first charging mode when the voltage detection value of the battery is less than the maximum charging voltage value.

3. The charging system of claim 1, wherein the controller determines a remaining charging time required for the battery to be charged to a state of charge (SOC) corresponding to the maximum charging voltage value, charges the battery in the first charging mode when the remaining charging time is longer than a predetermined reference time, and charges the battery in the second charging mode when the remaining charging time is shorter than or equal to the predetermined reference time.

4. The charging system of claim 1, wherein the controller determines one of the first charging mode and the second charging mode by applying the voltage detection value of the battery and charging current provided from the charging equipment to a charging mode determination table according to a relationship between a voltage or a state of charge (SOC) of the battery and the charging current provided from the charging equipment.

5. The charging system of claim 4, wherein the charging mode determination table is determined such that the first charging mode is executed when the voltage or the SOC of the battery is lower than a reference voltage or a reference SOC and the charging current is lower than a reference charging current, and the second charging mode is executed when the voltage or the SOC of the battery is higher than the reference voltage or the reference SOC and the charging current is higher than the reference charging current.

6. A charging method using a motor driving system including:
    an inverter including switching elements connected between a DC connecting terminal and a motor connecting terminal to which a battery is connected and configured to adjust on/off states of the switching elements to perform power conversion between the DC connecting terminal and the motor connecting terminal; a motor including a plurality of coils connected to the motor connecting terminal; and a first relay having a first end connected to the DC connecting terminal and a second relay having a first end connected to a neutral point of the motor, the second end of the first relay and the second end of the second relay being connected to a charging power input terminal, the charging method comprising:

comparing a voltage detection value of the battery with a maximum charging voltage value provided from a charging equipment to the charging power input terminal or comparing a state of charge (SOC) of the battery corresponding to the voltage detection value of the battery with an SOC corresponding to the maximum charging voltage value when charging starts;

executing a first charging mode, in which the first relay is closed and the second relay is opened such that charging power is directly applied to the DC connecting terminal to charge the battery, when the voltage detection value of the battery is less than the maximum charging voltage value or the SOC of the battery corresponding to the voltage detection value of the battery is less than the SOC corresponding to the maximum charging voltage value;

executing a second charging mode, in which the first relay is opened and the second relay is closed such that the charging power is applied to the neutral point of the motor and on/off states of the switching elements are controlled to convert the voltage of the charging power applied to the neutral point of the motor and output the converted voltage to the DC connecting terminal to charge the battery, when the voltage detection value of the battery is greater than or equal to the maximum charging voltage value or the SOC of the battery corresponding to the voltage detection value of the battery is greater than or equal to the SOC corresponding to the maximum charging voltage value;

changing a charging mode to the second charging mode in which the first relay is opened and the second relay is closed such that the charging power is applied to the neutral point of the motor and on/off states of the switching elements are controlled to convert the voltage of the charging power applied to the neutral point of the motor and output the converted voltage to the DC connecting terminal to charge the battery when the voltage detection value of the battery becomes greater than or equal to the maximum charging voltage value or the SOC corresponding to the voltage detection value of the battery becomes greater than or equal to the SOC corresponding to the maximum charging voltage value during execution of the first charging mode; and transmitting a charging current command of 0 A to the charging equipment when it is determined to change the charging mode to the second charging mode, controlling states of the first relay and the second relay to the second charging mode when current provided from the charging equipment substantially becomes 0 A, and increasing the charging current command such that the battery is charged in the second charging mode.

7. The charging method of claim 6, further comprising:

determining a remaining charging time required for the battery to be charged to the SOC corresponding to the maximum charging voltage value;

executing the first charging mode when the remaining charging time is longer than a predetermined reference time; and executing a second charging mode, in which the first relay is opened and the second relay is closed such that the charging power is applied to the neutral point of the motor and on/off states of the switching elements are controlled to convert the voltage of the charging power applied to the neutral point of the motor and output the converted voltage to the DC connecting terminal to charge the battery, when the remaining charging time is shorter than or equal to the predetermined reference time.

8. The charging method of claim 6, further comprising determining one of the first charging mode and the second charging mode by applying the voltage detection value of the battery and charging current provided from the charging equipment to a charging mode determination table according to a relationship between a voltage or an SOC of the battery and the charging current provided from the charging equipment.

9. The charging method of claim 8, wherein the charging mode determination table is determined such that the first charging mode is executed when the voltage or SOC of the battery is lower than a reference voltage or a reference SOC and the charging current is lower than a reference charging current, and the second charging mode is executed when the voltage or SOC of the battery is higher than the reference voltage or the reference SOC and the charging current is higher than the charging reference current.

* * * * *